(12) United States Patent
Höfler et al.

(10) Patent No.: US 12,351,001 B2
(45) Date of Patent: Jul. 8, 2025

(54) HEAT PUMP ASSEMBLY WITH A CHILLER FOR BATTERY-POWERED VEHICLES AND METHODS OF OPERATING THE HEAT PUMP ASSEMBLY

(71) Applicant: Hanon Systems, Daejeon (KR)

(72) Inventors: Matthias Höfler, Aachen (DE); Navid Durrani, Kerpen (DE); Toni Spies, Cologne (DE)

(73) Assignee: HANON SYSTEMS, Daejeon (KR)

(*) Notice: Subject to any disclaimer, the term of this patent is extended or adjusted under 35 U.S.C. 154(b) by 169 days.

(21) Appl. No.: 18/248,768

(22) PCT Filed: Dec. 8, 2021

(86) PCT No.: PCT/KR2021/018506
§ 371 (c)(1),
(2) Date: Apr. 12, 2023

(87) PCT Pub. No.: WO2022/131660
PCT Pub. Date: Jun. 23, 2022

(65) Prior Publication Data
US 2023/0382187 A1    Nov. 30, 2023

(51) Int. Cl.
*B60H 1/00* (2006.01)
*B60H 1/32* (2006.01)
*B60K 1/00* (2006.01)
*B60K 11/02* (2006.01)
*B60L 1/02* (2006.01)
*B60L 58/26* (2019.01)
(Continued)

(52) U.S. Cl.
CPC ..... *B60H 1/00899* (2013.01); *B60H 1/00278* (2013.01); *B60H 1/00921* (2013.01); *B60H 1/32281* (2019.05); *B60H 1/323* (2013.01); *B60K 11/02* (2013.01); *B60L 1/02* (2013.01); *B60L 58/26* (2019.02); *F25B 5/02* (2013.01);
(Continued)

(58) Field of Classification Search
CPC ............ B60H 1/00899; B60H 1/00278; B60H 1/00921; B60H 1/32281; B60H 1/323; B60H 2001/00307; B60H 2001/00949; B60H 1/32284; B60H 1/143; B60K 11/02; B60K 2001/005; B60L 1/02; B60L 58/26; B60L 2240/425; B60L 2240/545;
(Continued)

(56) References Cited

U.S. PATENT DOCUMENTS 11,407,275 B2 * 8/2022 Durrani .............. B60H 1/32284
11,433,735 B2 * 9/2022 Allgaeuer .......... B60H 1/00278
(Continued)

FOREIGN PATENT DOCUMENTS

CA  2877549 A1 * 7/2015 ............. B60L 1/003
DE  102016100971 A1  8/2016
(Continued)

*Primary Examiner* — Ljiljana V. Ciric
(74) *Attorney, Agent, or Firm* — Shumaker, Loop & Kendrick, LLP; James D. Miller

(57) ABSTRACT

A heat pump assembly with a chiller for battery-powered vehicles, having a refrigerant circuit with a compressor, a heating condenser, a refrigerant valve with an expansion function, an ambient heat exchanger, at least one evaporator with an associated refrigerant valve with an expansion function, as well as a 3/2-way refrigerant valve with an expansion function disposed in parallel to the evaporator with a refrigerant path via a chiller bypass and a refrigerant path via a chiller.

21 Claims, 4 Drawing Sheets

(51) Int. Cl.
  *F25B 5/02*    (2006.01)
  *F25B 6/04*    (2006.01)
(52) U.S. Cl.
  CPC ...... *F25B 6/04* (2013.01); *B60H 2001/00307* (2013.01); *B60H 2001/00949* (2013.01); *B60K 2001/005* (2013.01); *B60L 2240/425* (2013.01); *B60L 2240/545* (2013.01); *B60Y 2200/92* (2013.01); *F25B 2400/0403* (2013.01); *F25B 2400/0409* (2013.01); *Y02T 10/70* (2013.01)
(58) Field of Classification Search
  CPC ...... F25B 5/02; F25B 6/04; F25B 2400/0403; F25B 2400/0409; B60Y 2200/92; Y02T 10/70
  See application file for complete search history.

(56) References Cited

U.S. PATENT DOCUMENTS

| | | | |
|---|---|---|---|
| 12,070,985 B2* | 8/2024 | Eser | B60L 50/60 |
| 12,090,810 B2* | 9/2024 | Tiemeyer | B60H 1/143 |
| 2019/0344640 A1 | 11/2019 | Aikawa et al. | |
| 2020/0220236 A1 | 7/2020 | Durrani | |
| 2020/0247212 A1* | 8/2020 | Bara | B60H 1/10 |
| 2020/0384827 A1 | 12/2020 | Oh et al. | |
| 2022/0410655 A1* | 12/2022 | Lee | B60K 11/04 |
| 2023/0322048 A1* | 10/2023 | Durrani | B60H 1/00921 62/115 |
| 2023/0347709 A1* | 11/2023 | Steurer | B60H 1/00392 |
| 2023/0373272 A1* | 11/2023 | Hötzel | B60H 1/00885 |
| 2023/0382187 A1* | 11/2023 | Höfler | B60H 1/32281 |
| 2024/0317021 A1* | 9/2024 | Blessing | B60H 1/00735 |
| 2024/0383314 A1* | 11/2024 | Allgaeuer | B60H 1/00278 |

FOREIGN PATENT DOCUMENTS

| | | | | |
|---|---|---|---|---|
| DE | 102019109796 A1 | | 12/2019 | |
| DE | 102020100428 A1 | * | 8/2020 | ......... B60H 1/00007 |
| DE | 102020111505 A1 | | 12/2020 | |
| DE | 102022110716 A1 | * | 11/2023 | ......... B60H 1/00278 |
| DE | 102020111505 B4 | * | 1/2024 | ......... B60H 1/00278 |
| JP | 2020179839 A | | 11/2020 | |
| KR | 20200134039 A | | 12/2020 | |

\* cited by examiner

HEAT PUMP ASSEMBLY WITH A CHILLER FOR BATTERY-POWERED VEHICLES AND METHODS OF OPERATING THE HEAT PUMP ASSEMBLY

CROSS REFERENCE TO RELATED PATENT APPLICATIONS

This is a U.S. national phase patent application of PCT/KR2021/018506 filed Dec. 8, 2021 which claims the benefit of and priority to German Patent Application No. 10 2021 131 215.9 filed on Nov. 29, 2021 and German Patent Application No. 10 2020 134 054.0 filed on Dec. 17, 2020, the entire contents of each of which are incorporated herein by reference.

TECHNICAL FIELD

The invention relates to a heat pump assembly with a chiller for battery-powered vehicles.

Furthermore, the invention relates to methods of operating the heat pump assembly in selected operating modes, wherein the refrigerant circuit of the heat pump assembly also comprises the cooling of the cabin and thus constitutes a combined heat pump and refrigeration unit.

BACKGROUND ART

The field of application of the invention is in the field of electrically driven vehicles which generally use high-voltage batteries (HV batteries) as an energy storage to supply energy to the drive train of the vehicle. Other fields of application of the invention are in vehicles with so-called plug-in hybrids, which produce only small amounts of waste heat and the batteries of which are integrated into a thermal management system.

In this respect, efficient heat supply to the vehicle in combination with optimum thermal management of the battery and the electric drive train plays an important role.

Electric battery-powered vehicles generate relatively little waste heat, and thus there is a regular need with such vehicles to efficiently generate heat for heating the vehicle cabin and to provide it in sufficient quantity and at an appropriate temperature level.

In the prior art, refrigerant circuits for refrigeration unit and heat pump circuitry are known for this constellation, which are specifically tailored to battery-powered vehicles.

For example, DE 10 2019 109 796 A1 discloses a heat flow management device and a method of operating a heat flow management device, which has a refrigerant circuit and a drive train coolant circuit as well as a heating line heat transfer circuit.

DE 10 2016 100 971 A1 relates to a climate control system for a vehicle with a heat pump subsystem, and DE 10 2008 062 176 A1 discloses a device and a method of controlling the temperature of electrical elements of a motor vehicle.

US 2019/0344640 A1 discloses a heat managing device for a vehicle which comprises a heat pump.

DE 10 2020 111 505 A1 relates to a heat pump assembly for battery-powered vehicles and a method of operating a heat pump assembly, wherein multiple chillers are required for coupling the refrigerant circuit and the heat transfer circuit in order to utilize the waste heat of the vehicle.

However, these systems are often very complex and rarely able to combine the needs and requirements of the vehicle occupants for an adequate heat supply via the air conditioner of the vehicle, which is also referred to as an air conditioning device, with the cooling or even heating of the battery and the electric drive train that is optimally required in each of the various operating states.

The object of the invention is to provide a heat pump assembly for battery-powered vehicles which combines increased efficiency of the heat pump for supplying heat to the air conditioner for the passenger compartment of the motor vehicle with the possibility of optimum heat supply to the battery, which not only includes efficient cooling but also heating required in certain operating states.

SUMMARY

The heat pump assembly within a thermal management system for battery-powered electric vehicles is to enable flexible operation under a wide range of operating/ambient conditions. The operation of the vehicle and hence of the thermal management system is affected by various factors, such as ambient and driving conditions, user comfort requirements, and component functionality of the battery, electric drive train and control units, and safety aspects. Thus, a reliable, vehicle-wide thermal management and heat pump assembly are required to ensure operation of vehicle components within an allowable temperature window, while providing comfort features such as cabin air conditioning. In addition, the thermal systems must ensure safe operation of the vehicle, for example, de-icing and dehumidifying of the windshield to achieve antifogging properties.

The object is achieved by heat pump assemblies and methods having the features as shown and described herein.

The object of the invention is solved, in particular, by a heat pump assembly with a chiller for battery-powered vehicles, which has a refrigerant circuit and two coolant circuits, a battery coolant circuit and a drive train coolant circuit. The refrigerant circuit has at least one compressor, a heating condenser, a refrigerant valve with an expansion function associated with an ambient heat exchanger, at least one evaporator with an associated refrigerant valve with an expansion function as well as a 3/2-way refrigerant valve with an expansion function disposed in parallel to the evaporator with a refrigerant path via a chiller bypass and a refrigerant path via a chiller connected on the refrigerant side.

An ambient heat exchanger bypass with a refrigerant valve with an expansion function is disposed upstream of the chiller between the heating condenser and the downstream refrigerant valve with an expansion function.

The battery coolant circuit has a coolant pump, the chiller connected on the coolant side, a battery heat exchanger and a battery cooling radiator, wherein a battery cooler radiator bypass with an auxiliary coolant heater is disposed in the battery coolant circuit in parallel to the battery cooling radiator via a 3/2-way coolant valve.

The drive train coolant circuit has a coolant pump, a drive train cooler, and a drive train cooling radiator, wherein a fluid connection to the battery cooler radiator bypass of the battery coolant circuit is formed in parallel to the drive train cooling radiator.

Furthermore, a battery heat exchanger bypass with a 3/2-way coolant valve is disposed in the battery coolant circuit, which also forms a direct connection from the drive train coolant circuit to the chiller.

The functionalities of 3/2-way valves can also be achieved with individual components. However, this leads to higher expenditures in terms of equipment.

Advantageously, an air PTC is disposed in the air conditioner of the vehicle in addition to the heating condenser for heating the air for the vehicle cabin.

An advantageous embodiment of the heat pump assembly is that a drive train loop with a 3/2-way refrigerant valve is formed in parallel to the drive train cooling radiator. Moreover, the drive train loop is advantageously disposed in parallel to the fluid connection to the battery coolant circuit.

Advantageously, the ambient heat exchanger, the drive train cooling radiator and the battery cooling radiator are combined in one radiator unit.

More advantageously, a refrigerant collector is disposed upstream of the compressor in the refrigerant circuit, and it is preferred to use R134a or R1234yf as the refrigerant in the refrigerant circuit.

For the purposes of the invention, a heating condenser is understood to mean a heat exchanger which transfers heat within the air conditioner of the vehicle to the air flow of the air conditioner for heating the vehicle cabin. The ambient heat exchanger is intended to be a heat exchanger which, if the assembly is operated as a heat pump, absorbs heat from the ambient air as a radiator, or which releases heat to the ambient air when operated as a refrigeration unit.

A chiller is a heat exchanger which is integrated into the refrigerant circuit on one side and into the coolant circuit on the other side, wherein the chiller supplies cold to the battery heat exchanger and the drive train cooler on the coolant side and releases heat on the refrigerant side.

The refrigerant collector is also referred to as an accumulator and may optionally also be designed and operated as a separator for liquid refrigerant upstream of the compressor.

A bypass is understood to mean a refrigerant line which bypasses a component of the refrigerant circuit or directs a part of the refrigerant mass flow in parallel to the relevant component.

The coolant circuits of the vehicle are thermally coupled to the refrigerant circuit via the chiller and usually contain a water/glycol mixture which acts as a coolant or also as a heat transfer medium, depending on the operating state of the entire system.

The low-temperature coolers are coolant coolers designed as radiators which release heat to the ambient air. In the coolant circuit, the battery heat exchanger absorbs waste heat from the battery and dissipates it to enable an optimum mode of operation of the battery. The drive train cooler also absorbs heat from the components of the drive train to cool the same. For example, components of the drive train are electronic components producing waste heat as well as the electromotive drive itself.

Active cooling is understood to mean cooling by means of a refrigerant circuit, whereas passive cooling is understood to mean cooling by means of radiators with release of heat to the environment.

The concept of the invention is that the thermal management system of a battery-powered electric vehicle uses the heat pump assembly according to the invention to link various heat sources and sinks via both refrigerant and coolant circuits. In general, the operation of the system is highly flexible to enable efficient, powerful and dynamic operation of all components and to ensure situation-dependent cooling or heating of the various vehicle components.

Depending on the application of the vehicle, the thermal system architectures can differ significantly, for example in terms of whether a heat pump functionality is included. In general, more flexible systems enable more versatile and efficient heat transfer between the vehicle components. However, this added efficiency and performance typically have an impact on system complexity and the associated system costs.

A key aspect of the design of a thermal management system is the structure of the refrigerant circuit, including the number of heat exchangers which connect the refrigerant system to the refrigerant circuits. In general, the most efficient system designs have a dual-chiller layout with two separate heat exchangers in addition to the evaporator in the air path of the air conditioner, which are connected to different refrigerant circuits. In this way, parallel operation of both coolant circuits is possible, allowing maximum flexibility. Such a layout increases the system complexity of the refrigerant system, especially on the (low-pressure) suction side. This results in higher pressure losses, which has a negative impact on the efficiency of the system and leads to a reduction in the COP (coefficient of performance). Moreover, the complex circuitry results in increased packaging and system costs.

In addition, thermal management systems must ensure adequate cabin heating and cooling capacity under all operating conditions, both in steady-state and in highly transient operation. While heat pump system architectures generally allow the use of various heat sources present on board, for example, ambient, drive train, battery, processor units, and the like, these sources are sometimes insufficient, especially during high-transient operation, with intense heating.

For example, one critical operating case is the commissioning of a vehicle at very low ambient temperatures and with a cold vehicle cabin and battery. To ensure rapid heating of the cabin and battery, modern thermal management systems comprise additional electric heating elements, such as low- or high-voltage PTCs (PTC thermistors, positive temperature coefficient), which can be installed both in the coolant circuit and in the air path to the cabin. This technology is primarily used in non-heat pump systems, where heating of the supply air to the cabin is usually provided solely by air PTCs. But also heat pump systems are often supplemented with air PTCs for reasons of comfort due to higher heating capacity and improved system dynamics. However, the air PTCs significantly increase the overall costs of the systems.

According to the invention, two novel system architectures are derived as heat pump assemblies which enable flexible, powerful and efficient operation of a thermal management system. Both heat pump assemblies allow a reduction in the necessary components and thus a streamlining of the system architecture and the associated system costs. In addition, one embodiment allows the high-voltage PTC in the air path to be omitted, which enables a further, significant reduction in the overall system costs.

BRIEF DESCRIPTION OF DRAWINGS

Further details, features, and advantages of embodiments of the invention will become apparent from the following description of exemplary embodiments with reference to the accompanying drawings. In the drawings.

DESCRIPTION OF AN EMBODIMENT

Figure 1:
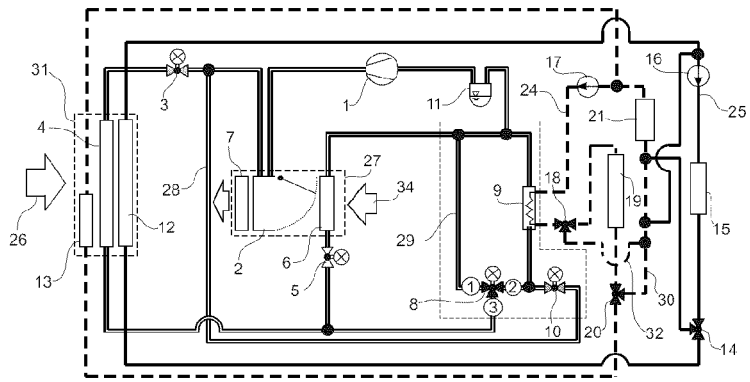
FIG. 1: shows a flow diagram of a heat pump assembly.

The heat pump assembly according to FIG. 1 consists of a central refrigerant circuit and two low-temperature cooling circuits, battery coolant circuit 24 for cooling/heating the battery, and drive train coolant circuit 25 for cooling/heating the electric drive train. The cabin air conditioning is provided by the refrigerant circuit. The system can be integrated into any vehicle having a standard air conditioning system architecture.

The refrigerant circuit of the thermal management system is shown with a double line and, in addition to evaporator 6 in the air path to the cabin, is based on a single refrigerant heat exchanger, chiller 9, which is connected to multiple expansion valves 8, 10. For maximum efficiency in the heating mode, the system has a direct heat exchanger in the air path for vehicle cabin air 34 of air conditioning device 27, heating condenser 2. The system is preferably designed to operate with refrigerants such as R134a and R1234yf. In air conditioning device 27 of the vehicle, vehicle cabin air 34 is conditioned. In a broader sense, this is to be understood to mean the cooling, heating as well as dehumidification of the air introduced into the vehicle cabin from air conditioning device 27, as required.

The system architecture enables flexible operation of the heat pump system in various operating modes such as cooling, heating and dehumidification with minimum use of expansion and directional valves using multiple heat sources and sinks, respectively. The respective heat sources and sinks are the environment, the high-voltage battery, the electric drive train with its electrical and electronic components, the high-voltage air PTC and the coolant heater.

Within the refrigerant circuit, compressor 1 is connected to heating condenser 2 integrated into air conditioning device 27. From heating condenser 2, the refrigerant can be passed to ambient heat exchanger (OHX) 4 via a refrigerant valve with an expansion function (EXV) 3. With refrigerant valve 3 between heating condenser 2 and ambient heat exchanger 4, it is possible to set different pressure levels between these two components. This function is needed to control the heat transfer to ambient air 26 in the cooling mode as well as the heat absorption from ambient air 26 in the heating mode. In this way, the overall system can be operated at three different pressure levels, wherein the medium pressure level can vary between the high-pressure and suction pressure levels.

As an alternative to the interconnection via ambient heat exchanger 4, heating condenser 2 is also connected to a refrigerant valve with an expansion function (EXV) 10 at the inlet to chiller 9 via ambient heat exchanger bypass 28.

In the cooling mode, the refrigerant is passed through ambient heat exchanger 4 to dissipate condensation heat to the environment. In the heating mode, the condensation heat is released in heating condenser 2 to heat vehicle cabin air 34 which is conditioned in air conditioning device 27.

The outlet of ambient heat exchanger 4 is connected both to a refrigerant valve with an expansion function 5 at the inlet to evaporator 6 and to a 3/2-way refrigerant valve with an expansion function 8. The 3/2-way refrigerant valve with an expansion function 8 has three ports denoted 1, 2 and 3. Ports 2 and 3 are outputs and port 1 is an input. While the expansion side of refrigerant valve 8 is connected to chiller 9 at output 2, output 1 provides a direct connection to the suction side of the system toward refrigerant collector 11 and compressor 1 via a bypass line referred to as chiller bypass 29. Instead of 3/2-way refrigerant valve with an expansion function 8, individual valves with the corresponding functionalities can also be employed as an alternative.

The refrigerant lines on the suction side from the outlet of evaporator 6, chiller 9 and chiller bypass 29 are preferably connected to each other upstream of the inlet into refrigerant collector 11. The outlet of refrigerant collector 11 is connected to the suction side of compressor 1. With this architecture, refrigerant can be partially evaporated, evaporated, and superheated in ambient heat exchanger 4, in evaporator 6 of air conditioning device 27 as well as in chiller 9.

Due to the specific system layout, the refrigerant circuit enables parallel operation of ambient heat exchanger 4 and chiller 9 at different pressure levels. If required, ambient heat exchanger 4 and chiller 9 can also be operated in serial mode. The operating mode can be flexibly adapted to the ambient and operating conditions, such as temperatures and heat sources of the vehicle.

Battery coolant circuit 24 is shown in a dashed line and communicates with the refrigerant circuit through chiller 9. At the outlet of chiller 9, the coolant is either guided via a 3/2-way coolant valve 18 to battery heat exchanger 19 for cooling the HV battery or via a parallel bypass line, battery heat exchanger bypass 32. At the output of battery heat exchanger 19, another 3/2-way coolant valve 20 directs the coolant toward battery cooling radiator 13 of battery coolant circuit 24 or, via battery cooler radiator bypass 30, toward optional auxiliary electric coolant heater 21 used for battery heating, for example. The coolant is circulated by using a coolant pump 17 at the inlet to chiller 9, which is connected to both battery cooling radiator 13 and optional auxiliary coolant heater 21.

Drive train coolant circuit 25 is shown with a continuous solid line and is used to cool the electric drive train through drive train cooler 15. At the outlet of drive train cooler 15 of the electric drive train, a 3/2-way coolant valve 14 directs the coolant to drive train cooling radiator 12. Drive train cooling radiator 12 is connected to coolant pump 16 which is located at the inlet to drive train cooler 15. In this way, drive train coolant circuit 25 can be used to passively cool the electric drive train, enabling efficient system operation. If the heat from the drive train is to be utilized, drive train coolant circuit 25 may be connected to battery coolant circuit 24 via 3/2-way coolant valve 14, as indicated schematically by the connection to battery cooler radiator bypass 30 of battery coolant circuit 24.

Additional cabin heating capacity can be achieved by using an air-side PTC heating element 7 in air conditioning device 27.

The radiators of the heat pump assembly, drive train cooling radiator 12, battery cooling radiator 13 and ambient heat exchanger 4, are preferably structurally combined in one radiator unit 31.

Figure 2:
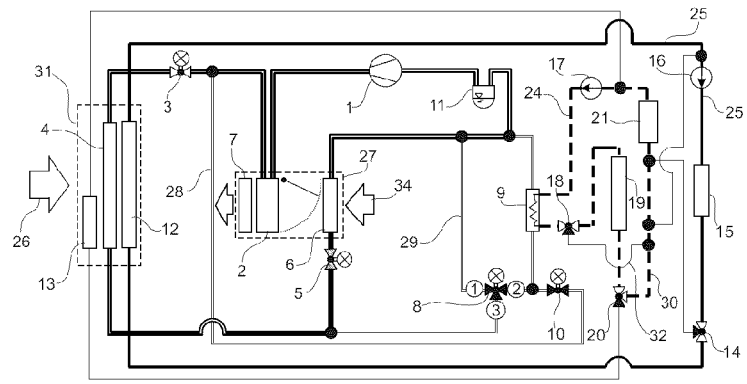
FIG. 2: shows a flow diagram of cabin cooling with the cabin as the heat source and the environment as the heat sink.

FIG. 2 shows mode 1 cabin cooling by means of highlighted components of the heat pump assembly of FIG. 1. Throughout the following figures, non-active components and/or refrigerant or coolant lines are shown in thin lines and active refrigerant or coolant lines are shown in thicker lines relative thereto.

In the following figures, the switching states of the valves are illustrated by how the symbols are represented. If the triangle symbols are shown only as an outline and empty, the valve is open. If the triangle symbols are completely filled, the valves are closed. If the valves are operated with the expansion function, where provided, the triangles are shown hatched.

The mode shown in FIG. 2 is designed for high ambient temperatures of more than 30° C.

In this mode, the refrigerant flows through air-cooled ambient heat exchanger (OHX) 4 downstream of compressor 1, releasing condensation heat to the environment. The refrigerant flow is expanded into evaporator 6 with EXV 5 disposed upstream of evaporator 6 to cool air 34 flowing into the cabin through evaporator 6. Refrigerant valve 3 is switched to maximum passage without an expansion function and heating condenser 2 of air conditioning device 27 is switched to no function, so that the refrigerant circuit releases the entire cooling capacity to air 34 to be cooled for the vehicle cabin.

Battery coolant circuit 24 operates in recirculation mode to homogenize the battery with respect to temperature distribution. Chiller 9 is not in operation, the corresponding refrigerant valves are closed, so that, in this mode, chiller 9 is without function with regard to heat transfer and is only passed through on the coolant side. The coolant flows in a cycle from coolant pump 17, via chiller 9, through battery heat exchanger 19 and battery cooler radiator bypass 30 back to coolant pump 17. In this mode, auxiliary coolant heater 21 is not in operation and has no function with regard to heat transfer.

The coolant of drive train coolant circuit 25 of the electric drive train is guided from coolant pump 16 via drive train cooler 15 and drive train cooling radiator 12 as a radiator and passively cooled by ambient air 26 in the process.

Figure 3:
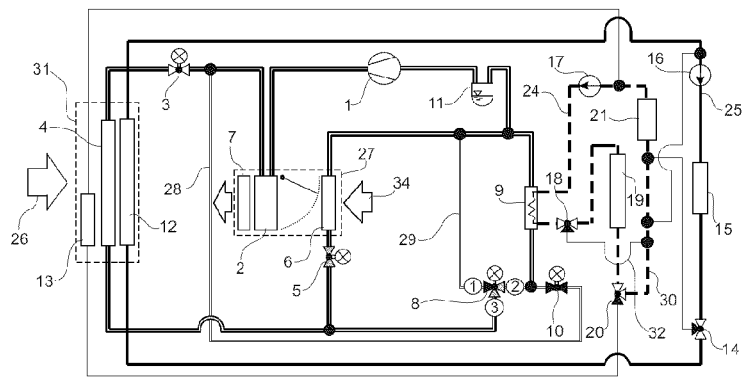
FIG. 3: shows a flow diagram of cabin cooling and active battery cooling with the cabin and the battery as the heat source and the environment as the heat sink.

FIG. 3 shows mode 2 cabin cooling and active battery cooling. This mode is used at high ambient temperatures of more than 30° C.

In this mode, the refrigerant flows through air-cooled ambient heat exchanger (OHX) 4, releasing condensation heat to ambient air 26. A partial flow of the refrigerant is expanded into evaporator 6 with EXV 5 disposed upstream of evaporator 6 to cool air 34 flowing into the cabin through evaporator 6 of air-conditioning device 27, analogously to mode 1. Refrigerant valve 3 is switched to no expansion function and heating condenser 2 is also without function.

The other partial flow of the refrigerant downstream of ambient heat exchanger (OHX) 4 is expanded in 3/2-way refrigerant valve with an expansion function 8 and evaporated in chiller 9 with absorption of heat from battery coolant circuit 24 to cool the battery and is then combined with the partial flow of refrigerant from the evaporator and directed via a refrigerant collector 11 to compressor 1.

Battery coolant circuit 24 operates in active cooling mode to cool the battery. The coolant absorbs heat from the battery in battery heat exchanger 19 and is then actively cooled by the refrigerant circuit in chiller 9, transferring heat to the refrigerant circuit. For this purpose, as described above, a partial flow of the refrigerant is guided in parallel to evaporator 6 via 3/2-way refrigerant valve with an expansion function (EXV) 8 and expanded when entering chiller 9. The coolant flows in a cycle from coolant pump 17, via chiller 9, through battery heat exchanger 19 and battery cooler radiator bypass 30 back to coolant pump 17. In this mode, auxiliary coolant heater 21 is not in operation and has no function with regard to heat transfer.

Analogously to the mode of operation according to FIG. 2, the coolant of drive train coolant circuit 25 of the electric drive train is guided from coolant pump 16 via drive train cooler 15 and drive train cooling radiator 12 as a radiator and passively cooled by ambient air 26 in the process.

Figure 4:
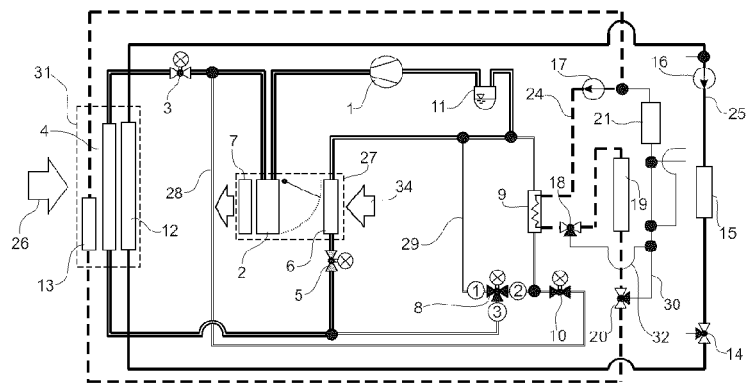
FIG. 4: shows a flow diagram of cabin cooling and passive battery cooling with the cabin as the heat source and the environment as the heat sink.

FIG. 4 shows the cabin cooling and passive battery cooling mode at high ambient temperatures of more than 30° C.

In this mode, the refrigerant flows through air-cooled ambient heat exchanger (OHX) 4, releasing condensation heat to ambient air 26. The refrigerant flow is expanded into evaporator 6 with refrigerant valve with an expansion function (EXV) 5 disposed upstream of evaporator 6 to cool vehicle cabin air 34 flowing through evaporator 6. Refrigerant valve 3 is switched to maximum passage without an expansion function and heating condenser 2 of air conditioning device 27 is switched to no function, so that the refrigerant circuit releases the entire cooling capacity to air 34 to be cooled for the vehicle cabin.

Battery coolant circuit 24 operates in passive cooling mode to cool the battery through battery heat exchanger 19. The coolant flows from coolant pump 17 through chiller 9 to battery heat exchanger 19, absorbs heat from the battery, and is then cooled in battery cooling radiator 13, transferring heat to ambient air 26. Chiller 9 is not in operation, the relevant refrigerant valves are closed.

The electric drive train is passively cooled via drive train coolant circuit 25 using drive train cooling radiator 12, analogously to the procedure shown in FIGS. 2 and 3.

Figure 5:
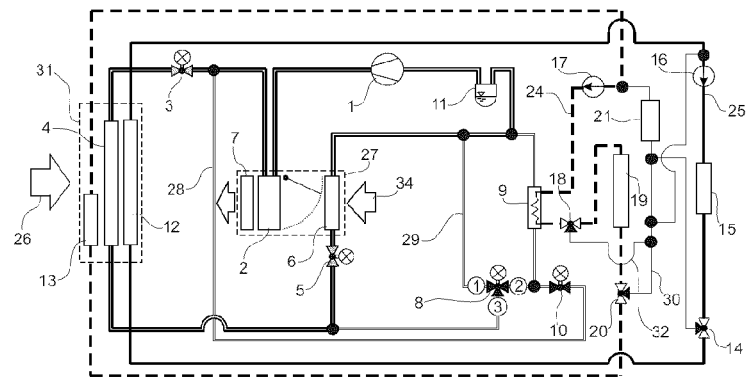
FIG. 5: shows a flow diagram of cabin reheating and active battery cooling with the cabin and the battery as the heat source and the environment as the heat sink.

FIG. 5 shows the cabin reheating and active battery cooling mode at relatively mild ambient temperatures of greater than 15° C.

In vehicle air conditioning, a reheating mode is understood to mean that air 34 to be supplied to the vehicle cabin is first cooled and dehumidified in air conditioning device 27 and then heated to a desired temperature. By reducing the humidity of vehicle cabin air 34, fogging of the vehicle windows is reduced and/or prevented.

In this mode, the refrigerant flows through air-cooled ambient heat exchanger (OHX) 4, releasing condensation heat to ambient air 26. The regulation of the heat release to ambient air 26 is accomplished through refrigerant valve with an expansion function (EXV) 3 before entering ambient heat exchanger (OHX) 4. In ambient heat exchanger (OHX) 4, the refrigerant is expanded to a medium pressure level.

The refrigerant flow is expanded into evaporator 6 with refrigerant valve with an expansion function (EXV) 5 disposed upstream of evaporator 6 to cool air 34 flowing into the cabin through evaporator 6. Subsequently, vehicle cabin air 34 is reheated by heating condenser 2 of air conditioning device 27. The heat flow required to reheat the air flow to the cabin is less than the heat flow extracted from the air flow in evaporator 6. The extraction of heat from air 34 described above and any associated extraction of humidity from air 34 and subsequent heating of air 34 to the desired temperature of air 34 for the vehicle cabin is referred to as reheating.

Battery coolant circuit 24 operates in passive cooling mode to cool the battery. The coolant absorbs heat from the battery via battery heat exchanger 19 and is then cooled in battery cooling radiator 13, transferring heat to ambient air 26. Chiller 9 is not in operation, the corresponding refrigerant valves are closed. The electric drive train is passively cooled through drive train cooling radiator 12 of drive train coolant circuit 25.

The mode of operation of battery coolant circuit 24 and drive train coolant circuit 25 corresponds to the circuitry and procedures described for FIG. 4.

Figure 6:
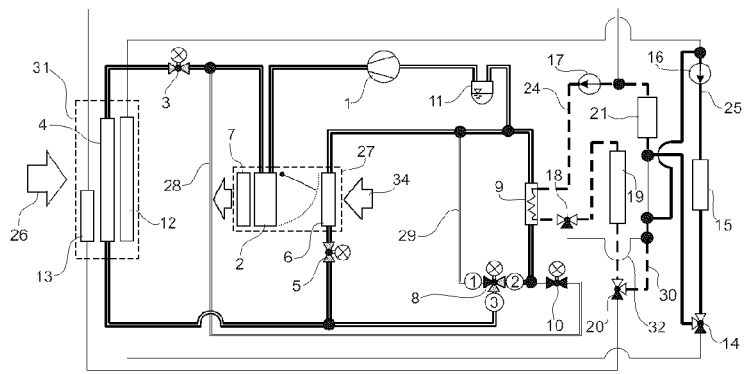
FIG. 6: shows a flow diagram of cabin reheating with the environment and the battery as the heat source and the cabin as the heat sink.

FIG. 6 shows the cabin reheating mode at low ambient temperatures of greater than 0° C.

In this mode, the refrigerant flows through air-cooled ambient heat exchanger (OHX) 4, transferring heat from the environment to the refrigerant. The refrigerant is evaporated or partially evaporated in the process. The regulation of the heat absorption from ambient air 26 is accomplished through refrigerant valve with an expansion function (EXV) 3 before entering ambient heat exchanger 4. In ambient heat exchanger 4, the refrigerant is expanded to a medium pressure level. Previously, heat from the refrigerant is transferred to the air flow for cabin air conditioning via heating condenser 2 and, additionally, vehicle cabin air 34 is heated by means of air PTC 7. Air PTC 7 is an additional heat exchanger for heating the air for the vehicle cabin according to the principle of PTC thermistors. These are also referred to as PTC resistors or PTCs. Alternatively, other additional heat exchangers can be used to heat vehicle cabin air 34.

Downstream thereof, a partial flow of the refrigerant is expanded into evaporator 6 by refrigerant valve with an expansion function 5 disposed upstream of evaporator 6 to cool air 34 flowing into the cabin through evaporator 6. Subsequently, vehicle cabin air 34 is reheated by heating condenser 2. Air PTC 7 may be active to assist in reheating the cabin supply air. The heat flow required to reheat the air flow to the cabin is greater and in particular much greater than the heat flow extracted from the air flow in evaporator 6.

In parallel, a partial flow of the refrigerant is expanded into chiller 9 through 3/2-way refrigerant valve with an expansion function (EXV) 8 disposed upstream of chiller 9. To increase system performance, heat from the electric drive train is transferred from drive train cooler 15 and optionally heat from the battery of battery heat exchanger 19 is transferred to the refrigerant via chiller 9. For this purpose, battery coolant circuit 24 operates in active cooling mode and is connected to drive train coolant circuit 25. In the mode shown, the coolant absorbs heat from the battery and the drive train and transfers this heat to the refrigerant circuit, where the heat is used to heat the vehicle cabin via heating condenser 2.

Battery coolant circuit 24 and drive train coolant circuit 25 are connected to each other and coolant flows in a cycle from coolant pump 17, via chiller 9, battery heat exchanger 19, 3/2-way coolant valve 20, coolant pump 16, and drive train cooler 15 to coolant pump 17. The radiators of the coolant circuits, drive train cooling radiator 12 and battery cooling radiator 13, are not operated in this mode.

Figure 7:
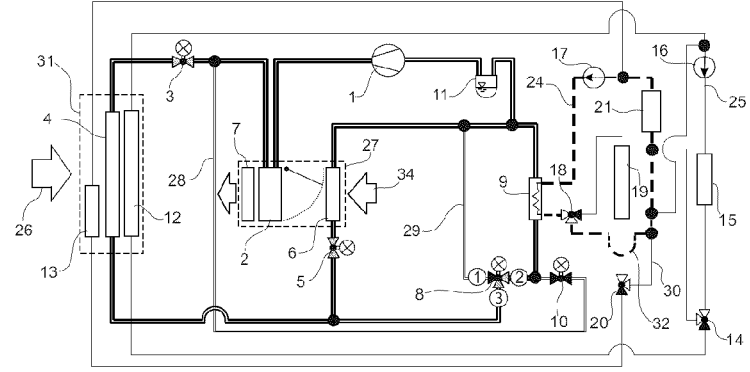
FIG. 7: shows a flow diagram of cabin reheating with the environment and the auxiliary heater as the heat source and the cabin as the heat sink.

FIG. 7 shows the cabin reheating mode at low ambient temperatures of greater than 0° C.

In this mode, the refrigerant flows through air-cooled ambient heat exchanger (OHX) 4, transferring heat from ambient air 26 to the refrigerant. The refrigerant is evaporated or partially evaporated in the process. The regulation of the heat absorption from ambient air 26 is accomplished through refrigerant valve with an expansion function (EXV) 3 before entering ambient heat exchanger (OHX) 4. In ambient heat exchanger (OHX) 4, the refrigerant is expanded to a medium pressure level. Previously, heat from the refrigerant is transferred to the air flow for cabin air conditioning via heating condenser 2, and the refrigerant is condensed and, additionally, vehicle cabin air 34 is heated by means of air PTC 7.

Downstream thereof, a partial flow of the refrigerant is expanded into evaporator 6 by refrigerant valve with an expansion function 5 disposed upstream of evaporator 6 to cool air 34 flowing into the cabin through evaporator 6. Subsequently, vehicle cabin air 34 is reheated by heating condenser 2. Air PTC 7 may be active to assist in reheating vehicle cabin air 34. The heat flow required to reheat the air flow to the cabin is greater than the heat flow extracted from the air flow in evaporator 6.

In parallel, a partial flow of the refrigerant is expanded into chiller 9 through 3/2-way refrigerant valve with an expansion function (EXV) 8 disposed upstream of chiller 9. To increase system performance, the auxiliary electric heater, auxiliary coolant heater 21, is active in battery cooler radiator bypass 30 of battery coolant circuit 24. Heat is transferred from auxiliary coolant heater 21 to the coolant circuit and then to the refrigerant via chiller 9, wherein battery heat exchanger 19 of battery is not passed through. In this case, the coolant of battery coolant circuit 24 flows in a cycle from chiller 9, via 3/2-way coolant valve 18, through battery heat exchanger bypass 32 with auxiliary coolant heater 21 to coolant pump 17 to chiller 9.

Figure 8:
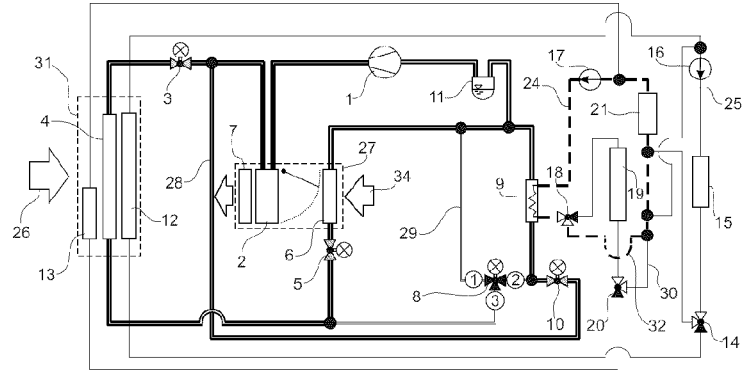
FIG. 8: shows a flow diagram of cabin reheating with the environment and the auxiliary heater as the heat source and the cabin as the heat sink.

FIG. 8 shows the cabin reheating mode at low ambient temperatures of greater than 0° C.

In this mode, a partial flow of the refrigerant flows through air-cooled ambient heat exchanger (OHX) 4, transferring heat from the environment to the refrigerant. The refrigerant is evaporated or partially evaporated in the process. The regulation of the heat absorption from ambient air 26 is accomplished through refrigerant valve with an expansion function (EXV) 3 before entering ambient heat exchanger (OHX) 4. Previously, heat from the refrigerant is transferred to vehicle cabin air 34 for cabin air conditioning via heating condenser 2, and the refrigerant is condensed and, additionally, air 34 for the vehicle cabin is heated by means of air PTC 7.

Downstream thereof, the refrigerant is expanded into evaporator 6 by refrigerant valve with an expansion function 5 disposed upstream of evaporator 6 to cool air 34 flowing into the cabin through evaporator 6. Subsequently, vehicle cabin air 34 is reheated by heating condenser 2. Air PTC 7 may be active to assist in reheating the cabin supply air. The heat flow required to reheat the air flow to the cabin is considerably higher than the heat flow extracted from vehicle cabin air 34 in evaporator 6.

In parallel, the remaining partial flow of the refrigerant is already branched off upstream of refrigerant valve with an expansion function (EXV) 3 to ambient heat exchanger (OHX) 4 via ambient heat exchanger bypass 28 and expanded via the single refrigerant valve with an expansion function (EXV) 10 upstream of chiller 9. This interconnection enables heat absorption at different pressure and/or temperature levels. The refrigerant paths to ambient heat exchanger (OHX) 4/evaporator 6 and to chiller 9 are operated in parallel. To increase system performance, the auxiliary electric heater, auxiliary coolant heater 21, is active in battery cooler radiator bypass 30 of battery coolant circuit 24. Heat is transferred from auxiliary coolant heater 21 to the coolant circuit and then to the refrigerant via chiller 9, wherein battery heat exchanger 19 of battery is not passed through. The coolant flows in a cycle from coolant pump 17, via chiller 9, 3/2-way coolant valve 18 and battery heat exchanger bypass 32, via auxiliary coolant heater 21, to coolant pump 17 of battery coolant circuit 24.

Figure 9:
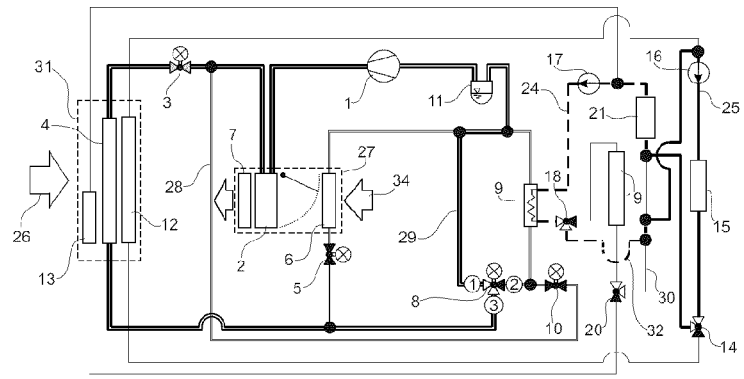
FIG. 9: shows a flow diagram of cabin heating with the environment as the heat source and the cabin as the heat sink.

FIG. 9 shows the cabin heating mode with the environment as the heat source at a low/cold ambient temperature of down to −20° C.

In this mode, the refrigerant flows through air-cooled ambient heat exchanger (OHX) 4, transferring heat from the environment to the refrigerant. The refrigerant is evaporated in the process. The regulation of the heat absorption from ambient air 26 is accomplished through refrigerant valve with an expansion function (EXV) 3 before entering ambient heat exchanger (OHX) 4. Previously, heat from the refrigerant is released to vehicle cabin air 34 for cabin air conditioning via heating condenser 2, and the refrigerant is condensed and, additionally, vehicle cabin air 34 can be heated by means of air PTC 7.

In this mode, ambient heat exchanger (OHX) 4 is the only heat source for the cabin heating, unless air PTC 7 is operated.

To maximize system efficiency, the refrigerant is directed past chiller 9 via chiller bypass 29 by means of 3/2-way refrigerant valve with an expansion function (EXV) 8, so that, in this mode, chiller 9 is switched off on the refrigerant side and the expansion function in 3/2-way refrigerant valve with an expansion function (EXV) 8 is not active.

Bypassing battery heat exchanger 19, battery coolant circuit 24 is directly interconnected with drive train coolant circuit 25 by means of battery heat exchanger bypass 32 via a 3/2-way coolant valve 18. The coolant flows from coolant pump 17, via functionless chiller 9, 3/2-way coolant valve 18, battery heat exchanger bypass 32, coolant pump 16, drive train cooler 15, and 3/2-way coolant valve 14 to coolant pump 17. This homogenizes the temperature distribution of the drive train. There is no heat is dissipated via the radiators of the coolant circuits.

Figure 10:
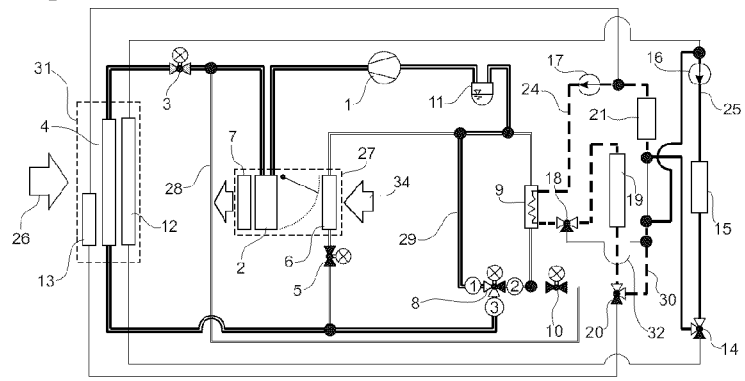
FIG. 10: shows a flow diagram of cabin heating with the environment and the drive train as the heat source and the cabin and the battery as the heat sink.

FIG. 10 shows the cabin heating mode with the ambient heat as the heat source at low/cold ambient temperatures of down to −20° C.

In this mode, the refrigerant flows through air-cooled ambient heat exchanger (OHX) 4, transferring heat from the environment to the refrigerant. The refrigerant is evaporated in the process. The regulation of the heat absorption from ambient air 26 is accomplished through refrigerant valve with an expansion function (EXV) 3 before entering ambient heat exchanger (OHX) 4. Previously, heat from the refrigerant is released to the air flow for cabin air conditioning via heating condenser 2, and the refrigerant is condensed and, additionally, vehicle cabin air 34 can be heated by means of air PTC 7.

Ambient heat exchanger (OHX) 4 is the only heat source for the cabin heating unless air PTC 7 is active. In this mode, the expansion function in 3/2-way refrigerant valve with an expansion function (EXV) 8 is not active.

To maximize system efficiency, the refrigerant is directed past chiller 9 via chiller bypass 29 by means of 3/2-way refrigerant valve with an expansion function (EXV) 8, so that, in this mode, chiller 9 is switched off on the refrigerant side.

Battery coolant circuit 24 is directly interconnected with drive train coolant circuit 25 via a 3/2-way coolant valve 20, wherein the coolant flow is guided through battery heat exchanger 19. The coolant flows from coolant pump 17, via functionless chiller 9, battery heat exchanger 19, 3/2-way coolant valve 20, coolant pump 16 and drive train cooler 15 to coolant pump 17. This transfers the heat from the drive train to the battery and homogenizes the temperature distribution in the drive train and the battery.

Figure 11:
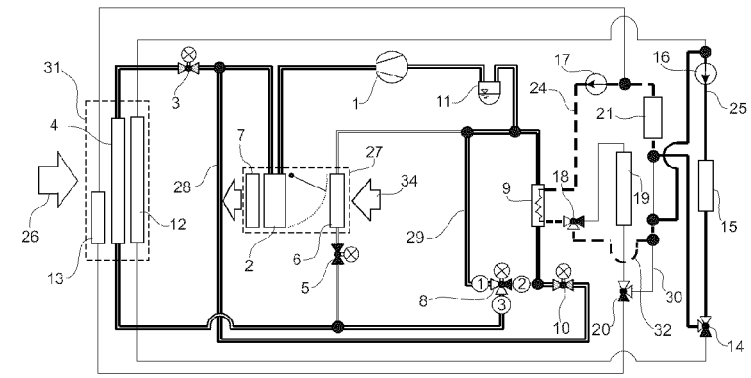
FIG. 11: shows a flow diagram of cabin heating with the environment and the drive train as the heat source and the cabin as the heat sink.

FIG. 11 shows the cabin heating mode with ambient heat and waste heat from the drive train as the heat sources at low/cold ambient temperatures of down to −20° C.

In this mode, a partial flow of the refrigerant flows through air-cooled ambient heat exchanger (OHX) 4, transferring heat from the environment to the refrigerant. The refrigerant is evaporated or partially evaporated in the process. The regulation of the heat absorption from ambient air 26 is accomplished through refrigerant valve with an expansion function (EXV) 3 before entering ambient heat exchanger (OHX) 4. To maximize system efficiency, the refrigerant is directed past chiller 9 via chiller bypass 29 by means of 3/2-way refrigerant valve with an expansion function (EXV) 8, so that, in this mode, chiller 9 is switched off on the refrigerant side.

In parallel, the remaining partial flow of the refrigerant is already branched off upstream of refrigerant valve with an expansion function (EXV) 3 to ambient heat exchanger (OHX) 4 via ambient heat exchanger bypass 28 and expanded via the single refrigerant valve with an expansion function (EXV) 10 upstream of chiller 9. This interconnection enables heat absorption at different pressure and/or temperature levels. The refrigerant paths to ambient heat exchanger (OHX) 4/evaporator 6 and to chiller 9 are operated in parallel.

Bypassing battery heat exchanger 19, battery coolant circuit 24 is directly interconnected with drive train coolant circuit 25. The coolant flows from coolant pump 17, via chiller 9, 3/2-way coolant valve 18, battery heat exchanger bypass 32, coolant pump 16, drive train cooler 15, and 3/2-way coolant valve 14 to coolant pump 17. This transfers heat from drive train coolant circuit 25 to the refrigerant circuit via chiller 9.

Heat sources for heating the cabin supply air, which is accomplished by heating condenser 2, are thus ambient air 26 as well as the waste heat from the drive train. Air PTC 7 may be active to assist in heating vehicle cabin air 34.

Figure 12:
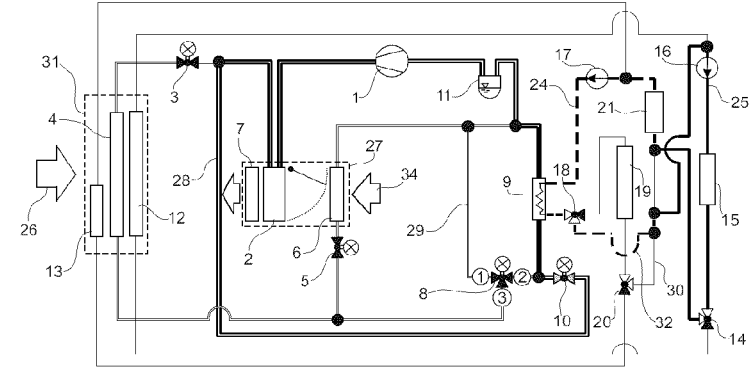
FIG. 12: shows a flow diagram of cabin heating with the drive train as the heat source and the cabin as the heat sink.

FIG. 12 shows the cabin heating mode with the waste heat from the drive train as the heat source at low/cold ambient temperatures of down to −20° C.

In this mode, to maximize system performance and efficiency, the entire refrigerant mass flow is already branched off upstream of the refrigerant valve with an expansion function (EXV) 3 to ambient heat exchanger (OHX) 4 via ambient heat exchanger bypass 28 and expanded via the single refrigerant valve with an expansion function (EXV) 10 upstream of chiller 9. This achieves complete shut-off of external ambient heat exchanger (OHX) 4 on the refrigerant side. This can significantly increase the suction pressure of the system.

The coupled coolant circuits 24 and 25 are designed as described for FIG. 11. Bypassing battery heat exchanger 19, battery coolant circuit 24 is directly interconnected with drive train coolant circuit 25 by means of 3/2-way coolant valve 18 and battery heat exchanger bypass 32. This transfers heat from drive train coolant circuit 25 to the refrigerant circuit via chiller 9.

Thus, the drive train is the primary heat source for heating vehicle cabin air 34, which is accomplished by heating condenser 2. Air PTC 7 may be active to assist in reheating the cabin supply air.

Figure 13:
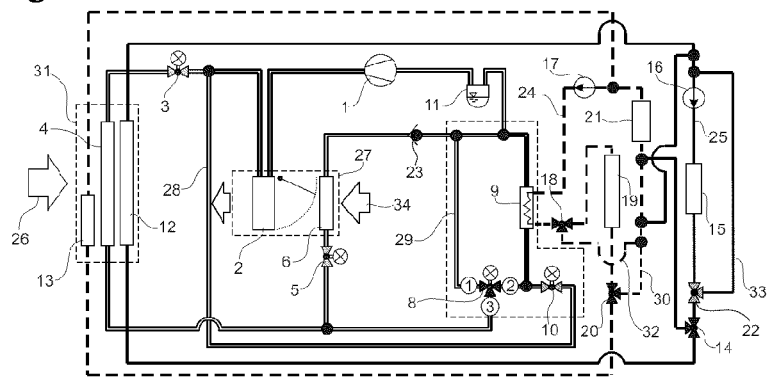
FIG. 13: shows a heat pump assembly with a drive train loop.

In FIG. 13, the heat pump assembly according to FIG. 1 is advantageously further improved.

In contrast to the circuit layout of the components in FIG. 1, the circuit layout according to FIG. 13 is supplemented downstream of evaporator 6 in the refrigerant flow direction by a check valve 23 in the refrigerant circuit, before chiller bypass 29 and the refrigerant-side output of chiller 9 are combined with the output from evaporator 6.

Furthermore, the circuit layout according to FIG. 13 does not provide for an air PTC 7 according to FIG. 1 for additional heating of vehicle cabin air 34.

Additionally, a drive train loop 33 with a 3/2-way coolant valve 22 is provided.

The heat pump assembly according to FIG. 13 consists of a central refrigerant circuit and two low-temperature cooling circuits, battery coolant circuit 24 for cooling/heating the battery, and drive train coolant circuit 25 for cooling/heating the electric drive train. The cabin air conditioning is provided by the refrigerant circuit. The system can be integrated into any vehicle having a standard air conditioning system architecture.

In addition, the heat pump assembly shown in FIG. 13 allows the omission of the high-voltage air PTC in the air path of air conditioning device 27, unlike the assembly shown in FIG. 1. For this purpose, the system enables the coolant heating of battery coolant circuit 24 to be used by means of auxiliary coolant heater 21 and the heat for the cabin heating to be provided by means of the heat pump function.

The refrigerant circuit of the thermal management system according to FIG. 13, in addition to evaporator 6 in the air path to the cabin, is based on a single refrigerant heat exchanger, chiller 9, which is connected to multiple expansion valves 8, 10, analogously to the embodiment according to FIG. 1. For maximum efficiency in the heating mode, the system has a direct heat exchanger in the air path of air conditioning device 27, heating condenser 2. The system is preferably designed to operate with refrigerants such as R134a and R1234yf.

Again, the system architecture allows flexible operation of the heat pump system in various operating modes such as cooling, heating and dehumidification with minimum use of expansion and directional valves using multiple heat sources and sinks, respectively. The respective heat sources and sinks are the environment, the HV battery, the electric drive train with its electrical and electronic components, and the coolant heater.

Within the refrigerant circuit, compressor 1 is connected to heating condenser 2 integrated into the air conditioning device. From heating condenser 2, the refrigerant can be passed to ambient heat exchanger (OHX) 4 via a refrigerant valve with an expansion function (EXV) 3. With refrigerant valve 3 between heating condenser 2 and ambient heat exchanger 4, it is possible to set different pressure levels between these two components. This function is needed to control the heat transfer to ambient air 26 in the cooling mode as well as the heat absorption from ambient air 26 in the heating mode. In this way, the overall system can be operated at three different pressure levels, wherein the medium pressure level can vary between the high-pressure and suction pressure levels.

As an alternative to the interconnection via ambient heat exchanger 4, heating condenser 2 is also connected to a refrigerant valve with an expansion function (EXV) 10 at the inlet to chiller 9 via ambient heat exchanger bypass 28.

In the cooling mode, the refrigerant is passed through ambient heat exchanger 4 to dissipate condensation heat to the environment. In the heating mode, the condensation heat is released in heating condenser 2 to heat vehicle cabin air 34 which is conditioned in air conditioning device 27.

The outlet of ambient heat exchanger 4 is connected both to a refrigerant valve with an expansion function 5 at the inlet to evaporator 6 and to a 3/2-way refrigerant valve with an expansion function 8. The 3/2-way refrigerant valve with an expansion function 8 has three ports denoted 1, 2 and 3. Ports 2 and 3 are outputs and port 1 is an input. While the expansion side of 3/2-way refrigerant valve 8 is connected to chiller 9 at output 2, output 1 provides a direct connection to the suction side of the system toward refrigerant collector 11 and compressor 1 via a bypass line referred to as chiller bypass 29. A check valve 23 is integrated into chiller bypass 29. Instead of 3/2-way refrigerant valve with an expansion function 8, individual valves with the corresponding functionalities can also be employed as an alternative.

The refrigerant lines on the suction side from the outlet of evaporator 6, chiller 9 and chiller bypass 29 are preferably connected to each other upstream of the inlet into refrigerant collector 11. The outlet of refrigerant collector 11 is connected to the suction side of compressor 1. With this architecture, refrigerant can be partially evaporated, evaporated, and superheated in ambient heat exchanger 4, in evaporator 6 of air conditioning device 27 as well as in chiller 9.

Due to the specific system layout, the refrigerant circuit enables parallel operation of ambient heat exchanger 4 and chiller 9 at different pressure levels. If required, ambient heat exchanger 4 and chiller 9 can also be operated in serial mode. The operating mode can be flexibly adapted to the ambient and operating conditions, such as temperatures and heat sources of the vehicle.

Battery coolant circuit 24 communicates with the refrigerant circuit through chiller 9. At the outlet of chiller 9, the coolant is guided via a 3/2-way coolant valve 18 either to battery heat exchanger 19 for cooling the HV battery or via a parallel bypass line, battery cooler radiator bypass 30. At the output of battery heat exchanger 19, another 3/2-way coolant valve 20 directs the coolant toward battery cooling radiator 13 of battery coolant circuit 24 or toward auxiliary electric coolant heater 21. The coolant is circulated by using a coolant pump 17 at the inlet to chiller 9, which is connected to both battery cooling radiator 13 and auxiliary coolant heater 21.

Drive train coolant circuit 25 is used to cool the electric drive train through drive train cooler 15. At the outlet of drive train cooler 15 of the electric drive train, a 3/2-way coolant valve 14 directs the coolant to drive train cooling radiator 12. Drive train cooling radiator 12 is connected to coolant pump 16 which is located at the inlet to drive train cooler 15. In this way, drive train coolant circuit 25 can be used to passively cool the electric drive train, enabling efficient system operation. If the heat from the drive train is to be utilized, drive train coolant circuit 25 may be connected to battery coolant circuit 24 via 3/2-way coolant valve 14, as indicated schematically by the connection to battery cooler radiator bypass 30 of battery coolant circuit 24.

Additionally, coolant may be recirculated through the drive train via a 3/2-way coolant valve 22 through drive train loop 33. The two 3/2-way coolant valves 14 and 22 can also be combined in a 4/2-way coolant valve.

Figure 14:
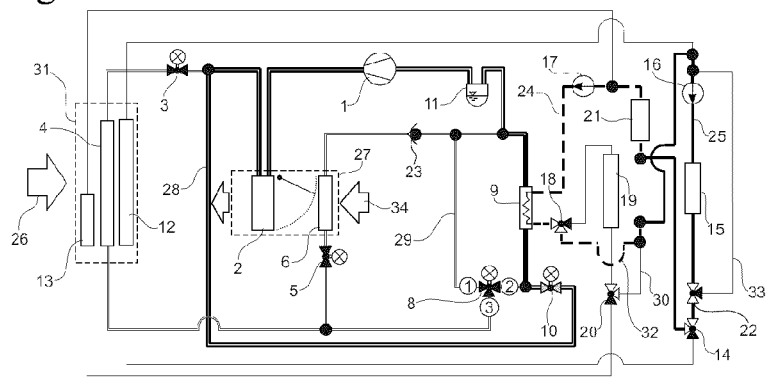
FIG. 14: shows a flow diagram of cabin heating with the drive train and the auxiliary heater as the heat source and the cabin as the heat sink.
Figure 15:
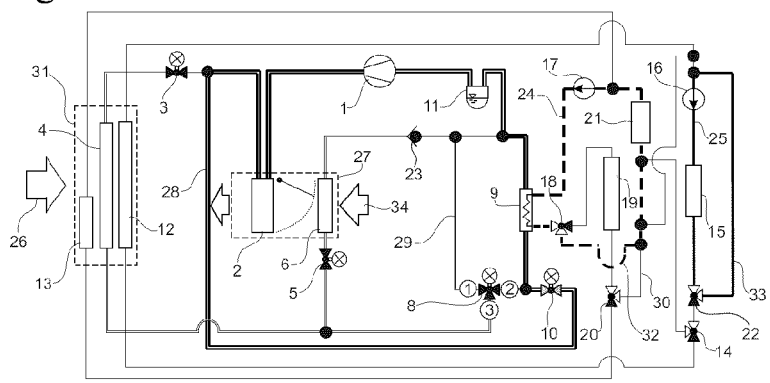
FIG. 15: shows a flow diagram of cabin heating with the auxiliary heater as the heat source and the cabin as the heat sink.
Figure 16:
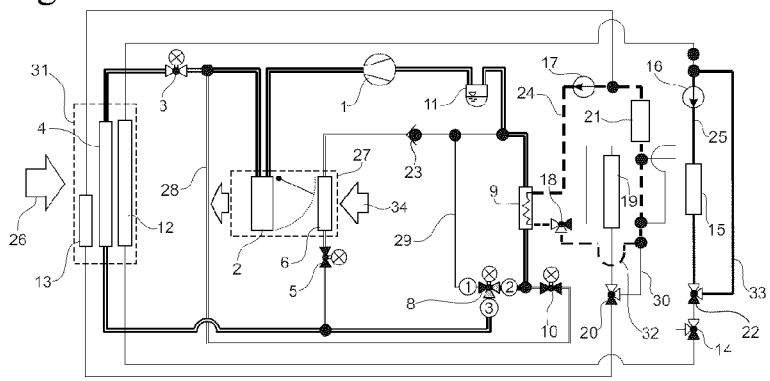
FIG. 16: shows a flow diagram of ambient heat exchanger de-icing with the auxiliary heater as the heat source and the cabin as the heat sink.

The modes realizable with the heat pump assembly according to FIG. 13 are identical to the modes of the heat pump assembly according to FIG. 1 shown in FIGS. 2 to 12, with the addition of the modes described on the following pages according to FIGS. 14 to 16 for the heat pump assembly according to FIG. 13.

FIG. 14 shows the cabin heating mode with the waste heat from the drive train and the heat of the auxiliary coolant heater 21 as the heat sources at low/cold ambient temperatures of down to −20° C.

To maximize system performance and efficiency, the entire refrigerant mass flow is guided via heating condenser 2 and superheat and condensation heat are released to vehicle cabin air 34 for cabin air conditioning and the refrigerant is condensed and branched off to ambient heat exchanger (OHX) 4 already upstream of refrigerant valve with an expansion function (EXV) 3 via ambient heat exchanger bypass 28 and guided via single refrigerant valve with an expansion function (EXV) 10 and expanded and evaporated in chiller 9 and then supplied to compressor 1. This achieves complete shut-off of external ambient heat exchanger (OHX) 4 on the refrigerant side.

This allows the suction pressure of the system to be significantly increased even at very low ambient temperatures.

The coupled coolant circuits 24 and 25 are designed as described for FIGS. 11 and 12. In contrast to these circuits, auxiliary coolant heater 21 is actively operated and the coolant is heated.

Bypassing battery heat exchanger 19, battery coolant circuit 24 is directly interconnected with drive train coolant circuit 25 by means of 3/2-way coolant valve 18 and battery heat exchanger bypass 32. This transfers the heat from drive train coolant circuit 25 and from auxiliary coolant heater 21 to the refrigerant circuit via chiller 9. The recirculation branch of the drive train, drive train loop 33, is deactivated in this mode.

Thus, the drive train and auxiliary coolant heater 21 are the primary heat sources for heating vehicle cabin air 34, which is accomplished by heating condenser 2. Here, the use of an air PTC can be omitted.

FIG. 15 shows the cabin heating mode with auxiliary coolant heater 21 as the heat source at low/cold ambient temperatures of down to −20° C.

In this mode, analogously to the mode from FIG. 14, to maximize system performance and efficiency, the entire refrigerant mass flow is already branched off upstream of the refrigerant valve with an expansion function (EXV) 3 to ambient heat exchanger (OHX) 4 via ambient heat exchanger bypass 28 and expanded via single refrigerant valve with an expansion function (EXV) 10 upstream of chiller 9. This achieves complete shut-off of external ambient heat exchanger (OHX) 4 on the refrigerant side.

This allows the suction pressure of the system to be significantly increased even at very low ambient temperatures.

Bypassing battery heat exchanger 19, battery coolant circuit 24 is not interconnected with the drive train coolant circuit by means of 3/2-way coolant valve 18 and battery heat exchanger bypass 32. Auxiliary coolant heater 21 is used as the heat source. Thus, the heat from auxiliary coolant heater 21 is transferred from battery coolant circuit 24 to the refrigerant circuit via chiller 9.

In this mode, the recirculation branch is active and provides for homogenization of the drive train temperature distribution by switching a short circuit through coolant pump 16, drive train cooler 15, 3/2-way coolant valve 22, and drive train loop 33.

Auxiliary coolant heater 21 is the only heat source for heating the cabin supply air, which is accomplished by heating condenser 2. Use of an air PTC can be omitted.

FIG. 16 shows the ambient heat exchanger (OHX) 4 de-icing mode at low/cold ambient temperatures of down to −20° C.

In this mode, to de-ice ambient heat exchanger (OHX) 4, the refrigerant flows unrestricted downstream of compressor 1 and heating condenser 2 through refrigerant valve 3 and, under high pressure and temperature, through air-cooled ambient heat exchanger (OHX) 4, wherein condensation heat is utilized to de-ice ambient heat exchanger (OHX) 4 and is finally released to ambient air 26. In this mode, refrigerant valve with an expansion function (EXV) 3 does not restrict the refrigerant mass flow.

Subsequently, the refrigerant is expanded into chiller 9 through 3/2-way refrigerant valve with an expansion function (EXV) 8 disposed upstream of chiller 9 and evaporated therein. In this mode, the suction pressure of the system can also be significantly increased even at very low ambient temperatures.

Again, in this mode, as described for FIG. 15, bypassing battery heat exchanger 19, battery coolant circuit 24 is not interconnected with drive train coolant circuit 25 by means of 3/2-way coolant valve 18 and battery heat exchanger bypass 32. Auxiliary coolant heater 21 is used as the heat source. Thus, the heat from auxiliary coolant heater 21 is transferred from battery coolant circuit 24 to the refrigerant circuit via chiller 9.

As described for FIG. 15, in this mode, drive train loop 33 of drive train coolant circuit 25 is also active and provides for homogenization of the drive train temperature distribution by switching a short circuit through coolant pump 16, drive train cooler 15, 3/2-way coolant valve 22, and drive train loop 33.

The heating of vehicle cabin air 34 is accomplished exclusively by heating condenser 2. Use of an air PTC can be omitted.

LIST OF REFERENCE NUMERALS

TABLE 1

| | |
|---|---|
| 1 | Compressor |
| 2 | Heating condenser |
| 3 | Refrigerant valve with an expansion function (EXV) |
| 4 | Ambient heat exchanger (OHX) |
| 5 | Refrigerant valve with an expansion function (EXV)/evaporator |
| 6 | Evaporator |
| 7 | Air PTC |
| 8 | 3/2-way refrigerant valve with an expansion function (EXV) |
| 9 | Chiller |

TABLE 1-continued

| 10 | Refrigerant valve with an expansion function (EXV) |
| 11 | Refrigerant collector |
| 12 | Drive train cooling radiator of the drive train coolant circuit |
| 13 | Battery cooling radiator of the battery coolant circuit |
| 14 | 3/2-way coolant valve |
| 15 | Drive train cooler |
| 16 | Coolant pump |
| 17 | Coolant pump |
| 18 | 3/2-way coolant valve |
| 19 | Battery heat exchanger |
| 20 | 3/2-way coolant valve |
| 21 | Auxiliary coolant heater |
| 22 | 3/2-way coolant valve |
| 23 | Check valve |
| 24 | Battery coolant circuit for cooling the HV battery |
| 25 | Drive train coolant circuit for cooling the electric drive train |
| 26 | Ambient air |
| 27 | Air-conditioning device |
| 28 | Ambient heat exchanger bypass |
| 29 | Chiller bypass |
| 30 | Battery cooler radiator bypass |
| 31 | Radiator unit |
| 32 | Battery heat exchanger bypass |
| 33 | Drive train loop |
| 34 | Vehicle cabin air |

The invention claimed is:

1. A heat pump assembly with a chiller for battery-powered vehicles, comprising a refrigerant circuit with a compressor, a heating condenser, a first refrigerant valve with an expansion function, an ambient heat exchanger, at least one evaporator with an associated second refrigerant valve with an expansion function, as well as a first 3/2-way refrigerant valve with an expansion function disposed in parallel to the at least one evaporator with a refrigerant path via a chiller bypass and a refrigerant path via the chiller, wherein an ambient heat exchanger bypass with a third refrigerant valve with an expansion function is disposed upstream of the chiller between the heating condenser and the first refrigerant valve with the expansion function, and further comprising a battery coolant circuit with a first coolant pump, the chiller, a battery heat exchanger, and a battery cooling radiator, wherein a battery cooler radiator bypass with an auxiliary coolant heater is disposed in parallel to the battery cooling radiator via a first 3/2-way coolant valve in the battery coolant circuit, and having a drive train coolant circuit with a second coolant pump, a drive train cooler, and a drive train cooling radiator, wherein a fluid connection is formed in parallel to the drive train cooling radiator from the drive train coolant circuit to the battery cooler radiator bypass of the battery coolant circuit, and that a battery heat exchanger bypass with a second 3/2-way coolant valve is formed for connecting the drive train coolant circuit to the chiller of the battery coolant circuit.

2. The heat pump assembly according to claim 1, wherein an air PTC is disposed in an air conditioning device in addition to the heating condenser for heating air for a vehicle cabin.

3. The heat pump assembly according to claim 1, wherein a drive train loop is formed with a second 3/2-way refrigerant valve in parallel to the drive train cooling radiator.

4. The heat pump assembly according to claim 1, wherein the ambient heat exchanger, the drive train cooling radiator, and the battery cooling radiator are combined in one radiator unit.

5. The heat pump assembly according to claim 1, wherein a refrigerant collector is disposed upstream of the compressor in the refrigerant circuit.

6. The heat pump assembly according to claim 1, wherein R134a or R1234yf is used as a refrigerant in the refrigerant circuit.

7. A method of operating the heat pump assembly according to claim 1 for actively cooling a vehicle cabin, for homogenizing a temperature distribution of a battery and for passively cooling a drive train at ambient temperatures of more than 30° C., wherein a refrigerant is condensed downstream of the compressor in the ambient heat exchanger, is expanded in the second refrigerant valve with the expansion function and is evaporated in the at least one evaporator with absorption of heat from air for cooling the vehicle cabin and is directed to the compressor, wherein the battery coolant circuit with the first coolant pump, the battery heat exchanger and the battery cooler radiator bypass is operated in recirculation mode without heating or cooling, and the drive train coolant circuit with the second coolant pump, the drive train cooler and the drive train cooling radiator is operated for passive cooling.

8. A method of operating the heat pump assembly according to claim 1 for actively cooling a vehicle cabin, for actively cooling a battery and for passively cooling a drive train at ambient temperatures of more than 30° C., wherein a refrigerant is condensed downstream of the compressor in the ambient heat exchanger and then a partial flow is expanded in the second refrigerant valve with the expansion function and evaporated in the at least one evaporator with absorption of heat from air for cooling the vehicle cabin and is directed to the compressor, and a partial flow is expanded in the first 3/2-way refrigerant valve with the expansion function and is evaporated in the chiller with absorption of heat from the battery coolant circuit for cooling the battery and is directed to the compressor, wherein the battery coolant circuit with the first coolant pump, the chiller and the battery heat exchanger is operated in an active cooling mode and the battery cooler radiator bypass is operated without heating and the drive train coolant circuit with the second coolant pump, the drive train cooler and the drive train cooling radiator is operated for passive cooling.

9. A method of operating the heat pump assembly according to claim 1 for actively cooling a vehicle cabin, for passively cooling a battery and for passively cooling a drive train at ambient temperatures of more than 30° C., wherein a refrigerant is condensed downstream of the compressor in the ambient heat exchanger, is expanded in the second refrigerant valve with the expansion function and is evaporated in the at least one evaporator with absorption of heat from air for cooling the vehicle cabin and is directed to the compressor, wherein the battery coolant circuit from the first coolant pump, via the chiller, the battery heat exchanger and the battery cooling radiator is operated for passive cooling, and the drive train coolant circuit with the second coolant pump, the drive train cooler and the drive train cooling radiator is operated for passive cooling.

10. A method of operating the heat pump assembly according to claim 1 for a reheating mode of a vehicle cabin, for passively cooling a battery and for passively cooling a drive train at ambient temperatures of more than 15° C., wherein a refrigerant releases heat downstream of the compressor in the heating condenser, is then expanded in the first refrigerant valve with the expansion function to a medium pressure level and releases heat in the ambient heat exchanger, is expanded in the second refrigerant valve with the expansion function to a low-pressure level and is evaporated in the at least one evaporator with absorption of heat from air and is directed to the compressor, wherein the battery coolant circuit from the first coolant pump, via the chiller, the battery heat exchanger and the battery cooling radiator is operated for passive cooling, and the drive train coolant circuit with the second coolant pump, the drive train cooler and the drive train cooling radiator is operated for passive cooling.

11. A method of operating the heat pump assembly according to claim 1 for a reheating mode of a vehicle cabin, for actively cooling a battery and for actively cooling a drive train at ambient temperatures of more than 0° C., wherein a refrigerant releases heat downstream of the compressor in the heating condenser, is then expanded in the first refrigerant valve with the expansion function to a medium pressure level and absorbs heat in the ambient heat exchanger, and then, a partial flow is expanded in the second refrigerant valve with the expansion function and evaporated in the at least one evaporator with absorption of heat from air and is directed to the compressor, and a partial flow is expanded in the first 3/2-way refrigerant valve with the expansion function and evaporated in the chiller with absorption of heat from the battery coolant circuit and from the drive train coolant circuit and is directed to the compressor, wherein the battery coolant circuit and the drive train coolant circuit are connected to each other and coolant flows from the first coolant pump, via the chiller, the battery heat exchanger, the first 3/2-way coolant valve, the second coolant pump, the drive train cooler to the first coolant pump.

12. A method of operating the heat pump assembly according to claim 1 for a reheating mode of a vehicle cabin at ambient temperatures of more than 0° C., wherein a refrigerant releases heat downstream of the compressor in the heating condenser, is then expanded in the first refrigerant valve with the expansion function to a medium pressure level and absorbs heat in the ambient heat exchanger, and then, a partial flow is expanded in the second refrigerant valve with the expansion function and evaporated in the at least one evaporator with absorption of heat from air and is directed to the compressor, and a partial flow is expanded in the first 3/2-way refrigerant valve with the expansion function and evaporated in the chiller with absorption of heat from the battery coolant circuit and is directed to the compressor, wherein, in the battery coolant circuit, coolant flows from the first coolant pump, via the chiller, the second 3/2-way coolant valve and the battery heat exchanger bypass, via the auxiliary coolant heater to the first coolant pump, wherein the auxiliary coolant heater is operated.

13. A method of operating the heat pump assembly according to claim 1 for a reheating mode of a vehicle cabin at ambient temperatures of more than 0° C., wherein a refrigerant releases heat downstream of the compressor in the heating condenser, then a partial flow is expanded in the first refrigerant valve with the expansion function to a medium pressure level and absorbs heat in the ambient heat exchanger, is then expanded in the second refrigerant valve with the expansion function and evaporated in the at least one evaporator with absorption of heat from air and is directed to the compressor, and a partial flow is branched off upstream of the first refrigerant valve with the expansion function and guided, via the ambient heat exchanger bypass, to the third refrigerant valve with the expansion function and is expanded and then evaporated in the chiller and is directed to the compressor, wherein, in the battery coolant circuit, coolant flows from the first coolant pump, via the chiller, the second 3/2-way coolant valve and the battery heat exchanger bypass, via the auxiliary coolant heater to the first coolant pump, wherein the auxiliary coolant heater is operated.

14. A method of operating the heat pump assembly according to claim 1 for heating a vehicle cabin at ambient temperatures of more than −20° C., wherein a refrigerant releases heat downstream of the compressor in the heating condenser, is expanded in the first refrigerant valve with the expansion function and absorbs heat in the ambient heat exchanger and is then directed to the compressor via the first 3/2-way refrigerant valve and the chiller bypass, wherein the battery coolant circuit and the drive train coolant circuit are connected to each other and the coolant flows from the first coolant pump, via the chiller, the second 3/2-way coolant valve, the battery heat exchanger bypass, the second coolant pump, the drive train cooler and a third 3/2-way coolant valve to the first coolant pump.

15. A method of operating the heat pump assembly according to claim 1 for heating a vehicle cabin at ambient temperatures of more than −20° C., wherein a refrigerant releases heat downstream of the compressor in the heating condenser, is expanded in the first refrigerant valve with the expansion function and absorbs heat in the ambient heat exchanger and is then directed to the compressor via the first 3/2-way refrigerant valve and the chiller bypass, wherein the battery coolant circuit and the drive train coolant circuit are connected to each other and coolant flows from the first coolant pump, via the chiller, the battery heat exchanger, the first 3/2-way coolant valve, the second coolant pump, the drive train cooler to the first coolant pump.

16. A method of operating the heat pump assembly according to claim 1 for heating a vehicle cabin at ambient temperatures of more than −20° C., wherein a refrigerant releases heat downstream of the compressor in the heating condenser, then a partial flow is expanded in the first refrigerant valve with the expansion function and absorbs heat in the ambient heat exchanger and is then directed to the compressor via the first 3/2-way refrigerant valve and the chiller bypass, and a partial flow is branched off upstream of the first refrigerant valve with the expansion function and guided to the third refrigerant valve with the expansion function via the ambient heat exchanger bypass and expanded and is then evaporated in the chiller and directed to the compressor, wherein the battery coolant circuit and the drive train coolant circuit are connected to each other and the coolant flows from the first coolant pump, via the chiller, the second 3/2-way coolant valve, the battery heat exchanger bypass, the second coolant pump, the drive train cooler and a third 3/2-way coolant valve to the first coolant pump.

17. A method of operating the heat pump assembly according to claim 1 for heating a vehicle cabin at ambient temperatures of more than −20° C., wherein a refrigerant releases heat downstream of the compressor in the heating condenser, is then guided to the third refrigerant valve with the expansion function via the ambient heat exchanger bypass and expanded, is evaporated in the chiller and directed to the compressor, wherein the battery coolant circuit and the drive train coolant circuit are connected to each other, and the coolant flows from the first coolant pump, via the chiller, the second 3/2-way coolant valve, the battery heat exchanger bypass, the second coolant pump, the drive train cooler and a third 3/2-way coolant valve to the first coolant pump.

18. A method of operating the heat pump assembly according to claim 11, wherein an air PTC is operated to additionally heat the air for the vehicle cabin.

19. A method of operating the heat pump assembly according to claim 1 for heating a vehicle cabin at ambient temperatures of more than −20° C., wherein a refrigerant releases heat downstream of the compressor in the heating condenser, is then guided to the third refrigerant valve with the expansion function via the ambient heat exchanger bypass and expanded, is evaporated in the chiller and directed to the compressor, wherein the battery coolant circuit and the drive train coolant circuit are connected to each other, and a coolant flows from the first coolant pump, via the chiller, the second 3/2-way coolant valve, the battery heat exchanger bypass, the second coolant pump, the drive train cooler and a third 3/2-way coolant valve and the auxiliary coolant heater to the first coolant pump, wherein the auxiliary coolant heater is operated.

20. A method of operating the heat pump assembly according to claim 1 for heating a vehicle cabin at ambient temperatures of more than −20° C., wherein a refrigerant releases heat downstream of the compressor in the heating condenser, is then guided to the third refrigerant valve with the expansion function via the ambient heat exchanger bypass and expanded, is evaporated in the chiller and directed to the compressor, wherein, in the battery coolant circuit, the coolant flows from the first coolant pump, via the chiller, the second 3/2-way coolant valve and the battery heat exchanger bypass via the auxiliary coolant heater to the first coolant pump, wherein the auxiliary coolant heater is operated, and wherein, in the drive train coolant circuit, the coolant flows from the second coolant pump, via the drive train cooler, a 3/2-way coolant valve and a drive train loop to the second coolant pump.

21. A method of operating the heat pump assembly according to claim 1 for heating a vehicle cabin at ambient temperatures of more than −20° C., wherein a refrigerant releases heat downstream of the compressor in the heating condenser and in the ambient heat exchanger, is then expanded in the first 3/2-way refrigerant valve with an expansion function and is evaporated in the chiller and directed to the compressor, wherein, in the battery coolant circuit, a coolant flows from the first coolant pump, via the chiller, the second 3/2-way coolant valve and the battery heat exchanger bypass via the auxiliary coolant heater to the first coolant pump, wherein the auxiliary coolant heater is operated and wherein, in the drive train coolant circuit, the coolant flows from the second coolant pump, via the drive train cooler, a 3/2-way coolant valve and a drive train loop to the second coolant pump.

* * * * *